Patented June 17, 1947

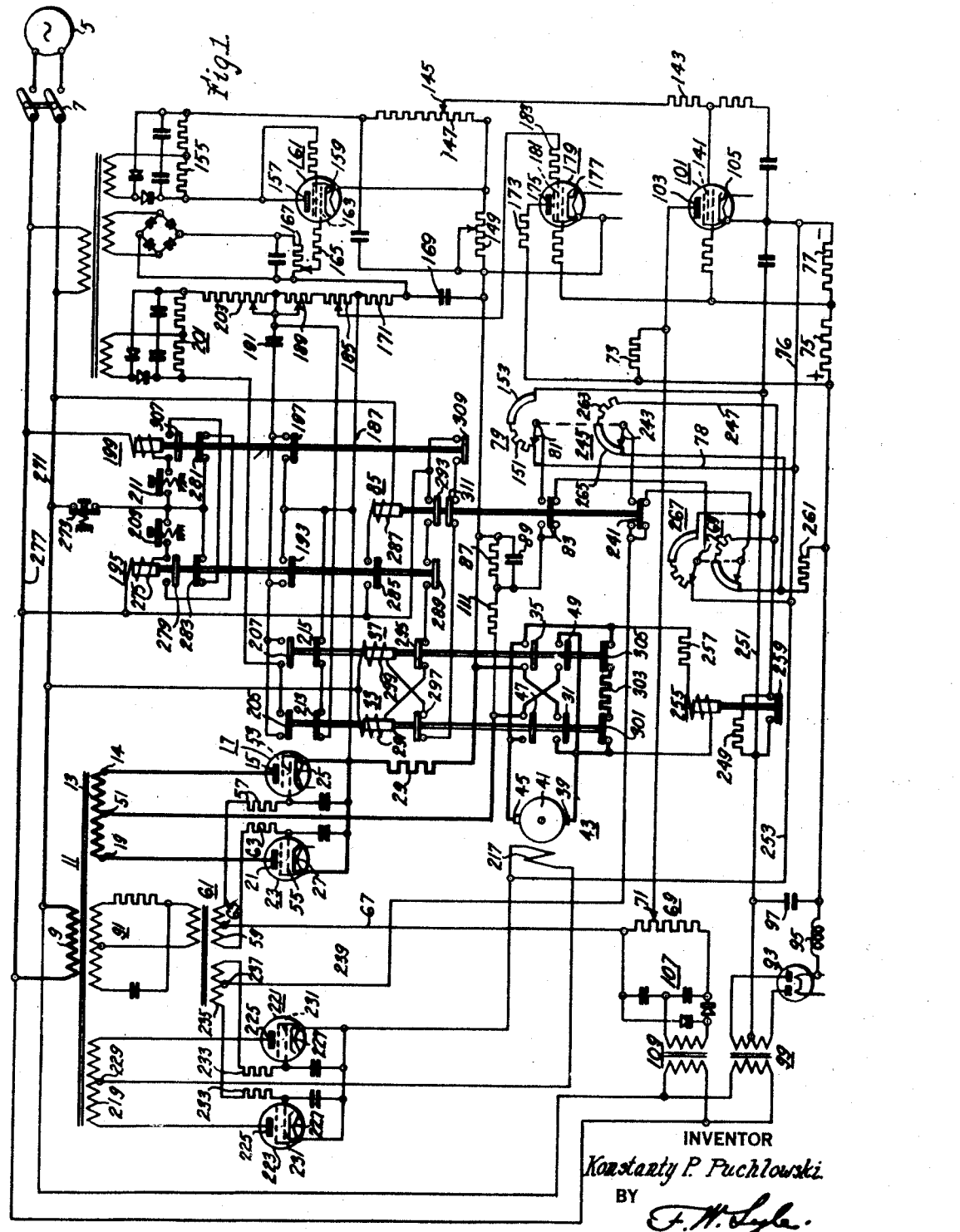

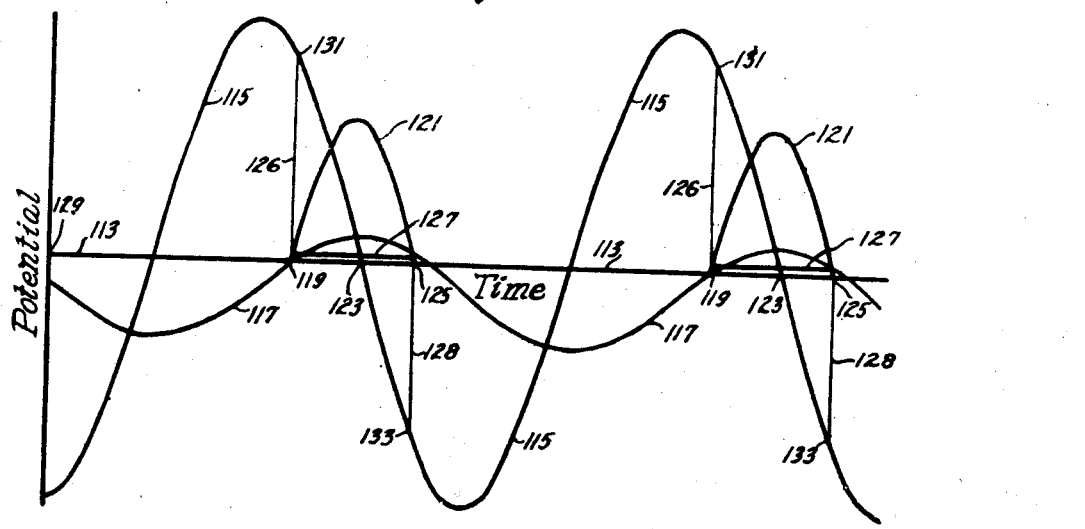

2,422,567

UNITED STATES PATENT OFFICE 2,422,567

ELECTRONIC CONTROL FOR MOTORS

Konstanty P. Puchlowski, Wilkinsburg, Pa., assignor to Westinghouse Electric Corporation, East Pittsburgh, Pa., a corporation of Pennsylvania Application July 24, 1943, Serial No. 495,993

22 Claims. (Cl. 172—239)

This invention relates to apparatus for controlling an electric motor, and has particular relation to an electronic circuit for controlling a direct-current motor supplied from an alternating-current source.

The desirability of an electric motor operated from an alternating-current source with an arrangement for the maintenance of a constant speed over an exceptionally wide adjustable speed range has been recognized for many years. A number of solutions have been offered in the past with some degree of success; for example, various slip clutch arrangements, modifications of the wound-rotor induction motor, and mechanical drives employing a constant speed alternating-current motor and a variable speed output shaft have been used. Another solution, which has been employed to a great extent, is an adjustable speed drive using a motor-generator set. However, none of these special adjustable speed motor drives are without some undesirable feature, whether it be a limited speed range, a poor speed-torque characteristic especially at low speeds, first cost, maintenance, mounting difficulties, excessive vibrations, or difficulties in providing controlled acceleration and reversing.

It is, accordingly, an object of my invention to provide a novel electronic control system for operating a direct-current motor from an alternating-current source.

Another object of my invention is to provide a novel electronic control system for operating a direct-current motor from an alternating-current source, which effects smooth acceleration of the motor to the desired speed.

Still another object of my invention is to provide a novel electronic control system for operating a direct-current motor from an alternating-current source which permits adjustment of the motor speed over an exceptionally wide range.

A further object of my invention is to provide a novel electronic control system for operating a direct-current motor from an alternating-current source which maintains the speed of the motor constant at any desired speed regardless of the load or variations of the load.

Another object of my invention is to provide a novel electronic control system for operating a direct-current motor from an alternating-current source which permits automatically controlled reversing of the motor.

A still further object of my invention is to provide a new and improved control system for operating a direct-current motor from an alternating current source so that full torque is delivered at low-speeds.

Another object of my invention is to provide an electronic control system for operating a direct-current motor from an alternating current source which provides protection for the motor and line by eliminating dangerous current peaks during starting and reversing of the motor.

Still another object of my invention is to provide an electronic control system for operating a direct current motor from an alternating current source, which secures improved commutation of the motor during reversal of the direction of rotation.

In accordance with my invention, current is supplied to the armature of a direct-current shunt wound motor from an alternating-current source through a pair of current rectifying electric discharge control valves. The control valves may be of the arc-like type, preferably thyratrons, and may be arranged to conduct current to the armature in each half-period of the source. The amount of current supplied to the armature then depends upon both the instant in a half-period of the source, known as the firing point, at which current conduction through the control valves is initiated, and the counter-electromotive force of the motor in circuit with the valves. Since the magnitude of the counter-electromotive force depends on the speed of the armature with a constant field, control of the motor is effected by controlling the firing point.

To control the firing point, a control potential is impressed between the control electrode, or grid, and the cathode of each control valve, which comprises an alternating potential of the same frequency as said source but displaced in phase relative thereto, superimposed on a variable continuous potential. As the continuous potential is varied, the firing point, i. e. the instant in a half-period of the source at which the grid-cathode potential rises above the critical value necessary to render the valve conductive, is varied.

The variable component of the control potential is made up primarily of a substantially constant potential, and a variable potential derived from an auxiliary direct-current source through a master electric valve. The master valve may be a pentode connected so that the magnitude of the variable potential depends upon the conductivity of the master valve.

For purposes of speed regulation, the conductivity of the master valve is controlled in accordance with the armature voltage and the armature current as well as the setting of a speed control potentiometer. Voltages proportional to the armature voltage and the speed control potentiometer setting are impressed directly in the control circuit of the master valve. Another voltage which varies with the magnitude of the current through the armature is also impressed in the control circuit of the master valve through an amplifying circuit including a first auxiliary electric valve. The effects of these voltages on the master valve are proportioned so that the conductivity of the master valve is controlled to automatically adjust the firing point of the control valves in accordance with torque variations. The firing point is advanced with increasing torque and delayed with decreasing torque so as to maintain constant speed for any particular setting of the speed control potentiometer.

A second amplifying circuit using a second auxiliary electric valve is connected to impress still another voltage in the control circuit of the master valve. However, the second auxiliary valve is non-conductive and has no effect on the master valve during normal operation of the motor at the selected speed. Instead the second amplifying circuit and valve are employed in controlling the acceleration and reversing of the motor and in protecting the motor from excessive current in case of an overload.

The second auxiliary valve is controlled in accordance with the difference between a potential proportional to the armature current and a potential appearing across a capacitor. The capacitor potential is controlled so that at the instant of operation of the starting device, the master valve maintains the control valves non-conductive. Thereafter, the firing point of the control valves is advanced gradually but rapidly to increase the average voltage of the armature. However, should the armature current tend to exceed a preselected limit during acceleration, the firing point is delayed.

It will be noted that an increase in armature current above a preselected value which is greater than the rated value tends to affect the master valve through both the first and second auxiliary valves but in opposite manners. However, the tube characteristics and the circuit constants are such that the amplifying action of the second auxiliary valve is much stronger than that of the first auxiliary valve and the action of the former completely overwhelms the opposing action of the latter.

As the speed of the motor increases the counter-electromotive force increases causing the armature current to decrease to its steady state value determined by the load conditions of the motor. When the motor is approaching its selected speed and the armature current consequently drops below the preselected value, the voltages in the control circuit of the second auxiliary valve cause it to become non-conductive. Thereafter, the first auxiliary valve takes over the control of the firing point of the control valves to maintain the speed constant at its selected value regardless of torque changes. However, the second auxiliary valve becomes effective to delay the firing point if an overload causes an excessive armature current.

A stopping device may also be provided which upon operation causes the second auxiliary valve to again assume control to delay the firing point of the control valves to the extent that they become non-conductive actually interrupting the armature circuit. Dynamic braking means are provided, as well as reversing means which may cause the motor to begin operation in the opposite direction under the control of the master valve if desired.

To enable the speed of the motor to be adjusted over an additional range above the rated speed, provisions are also made for weakening the strength of the motor field after the motor attains its rated or base speed. Current is supplied to the field through still other electric discharge field control valves, which are preferably thyratrons. In selecting the operating speed of the motor by manual adjustment of a potentiometer, a biasing potential is also selected for the field control valves. However, a relay responsive to the speed of the motor prevents the biasing potential from becoming effective until after the motor attains its rated speed. Thus the speed of the motor is controlled only by the armature control valves until the motor reaches its rated speed, and therafter, the field control valves may operate to weaken the field and increase the speed to the desired value greater than the rated speed. After the desired or ultimate speed is attained, the armature voltage is, of course, controlled in the manner described to maintain the speed of the motor substantially constant. Should the speed of the motor be reduced to or below the rated speed by manual adjustment, the biasing potential for the field control valves becomes ineffective, and the strength of the field is increased to its rated value. Consequently, the motor is always operating with a full field at speeds equal to or below its rated speed.

The novel features which I consider characteristic of my invention are set forth with particularity in the appended claims. The invention itself, however, both as to the organization and its method of operation, together with additional objects and advantages thereof, will best be understood from the following description of specific embodiments, when read in connection with the accompanying drawing, in which:

Fig. 1 is a schematic circuit diagram of the preferred embodiment of my invention; and Figs. 2 and 3 are graphs by which the operation of certain portions of the circuit may be best understood.

As shown in the drawings, an alternating-current source 5 is connected through a circuit breaker 7 to energize the primary 9 of a transformer 11. One of the secondaries 13 of the transformer has one end terminal 14 connected to the anode 15 of an electric discharge control valve 17, and the other end terminal 19 connected to the anode 21 of another electric discharge control valve 23. The cathodes 25 and 27 of control valves 17 and 23 are connected through a resistor 29, and a contactor 31 of a relay 33, or a contactor 35 of a relay 37, to one side, 39 or 45, as the case may be, of the armature of the motor 43. The other side, 45 or 39, as the case may be, of the armature 41 is connected through another contactor 47 of the relay 33, or contactor 49 of the relay 37, to a center tap 51 on the secondary 13 of the transformer 11. As will be explained hereinafter relay 33 is energized to close contactors 31 and 47 for what may be designated as forward rotation of the motor and relay 37 is energized to close contactors 35 and 49 for reverse rotation. It is also to be noted that resistor 29 has a low resistance and does not materially restrict the flow of current.

The control grids 53 and 55 of the control valves 17 and 23 respectively, are connected together in a circuit extending from one grid 53 through the grid resistor 57, the secondary 59 of another transformer 61, and another grid resistor 63, to the other grid 55. The control circuit of the control valve 17 extends from its grid 53 through the grid resistor 57, one half of the secondary 59 of the transformer 61, the center tap 65 of the transformer 61, a conductor 67, a portion of a potentiometer 69, the adjustable tap 71 on the potentiometer 69, a resistor 73, a pair of resistors 75 and 77, conductors 76 and 78, a portion of a speed control potentiometer 79 to the adjustable tap 81 thereon, and thence through a contactor 83 of a relay 85, which is energized for forward operation of the motor, a parallel path comprising a resistor 87 on one side and a capacitor 89 on the other side, and the resistor 29, to the cathode 25. The control circuit of the other control valve 23 may be similarly traced.

The transformer 61 is energized from the alternating-current source 5 through a phase-shifting circuit 91. Consequently, an alternating potential of the same frequency as the source, but displaced in phase relative thereto, is impressed in the control circuit of the control valves 17 and 23. The displacement of the phase is fixed at preferably 90 degrees lagging the source.

A direct current potential is developed across the series-connected resistors 75 and 77 and potentiometer 79 through a full wave rectifier 93 and filtering elements 95 and 97 energized from the source 5 and auxiliary transformer 99 connected thereto. The polarity of the potential across resistors 75 and 77 tends to make the control grids 53 and 55 of the control valve 17 and 23 positive with respect to the cathodes 25 and 27.

A potential is also developed across the resistor 73 of a magnitude dependent upon the conductivity of a master electric valve 101, which may be an amplifying tube preferably a pentode. The master valve 101 is connected in a circuit extending from the positive terminal of resistor 75 through resistor 73, and the anode 103 and cathode 105 of master valve 101 to the negative terminal of resistor 77. The polarity of the potential across resistor 73 opposes that of the resistors 75 and 77 in the control circuit of the control valves 17 and 23.

A direct current potential is also established across potentiometer 69 by a voltage doubling circuit 107 energized from the source through a transformer 109. The polarity of the potential across that portion of potentiometer 69 in the control circuit of the control valves 17 and 23 also opposes that of the resistors 75 and 77.

Resistor 87 in the control circuit of the control valves 17 and 23 is connected in series with another resistor 111 across the armature 41. Consequently, a potential proportional to the armature voltage is present across resistor 87. When current flows through the armature 41 it is apparent that a potential is developed across resistor 29 and, as previously pointed out, a potential also is impressed in the control circuit of the control valves 17 and 23 by a portion of potentiometer 79. However, the magnitudes of the various potentials impressed in the control circuit of the control valves is such that changes in the potentials across resistors 87 and 29 and potentiometer 79 have practically no effect on the control valves.

The control grid-cathode potential is, therefore, comprised primarily of the phase-shifted alternating potential supplied through transformer 61, a substantially constant potential supplied by potentiometer 69 and resistors 75 and 77, and a variable potential supplied by resistor 73. These potentials are so proportioned that when master valve 101 conducts a maximum current, the negative potential across resistor 73 is of a magnitude preventing the resultant control grid-cathode potential of the control valves from rising above the critical value necessary to render the valves conductive. If the conductivity of the master valve decreases gradually, the resultant control grid-cathode potential of the control valves rises above the critical value gradually earlier in successive half-periods of the source. In other words, the firing point of the valves is advanced when the conductivity of the master valve decreases.

Thus, a motor control system is provided in which current is supplied to the armature through grid controlled, control valves of the arc-like type with the firing point of the control valves in a half-period being determined by the conductivity of a master valve. To better understand the operation and performance of such a system it is desirable to refer to the characteristics of a conventional direct-current shunt-wound motor. It is well-known that a conventional shunt-wound motor normally has a slightly drooping speed-torque characteristic which may be represented by the following equation:

$$n = \frac{E - IR}{C\phi}$$

where $n$ is the number of revolutions per minute; $E$ is the direct-current voltage across the armature; $I$ is the armature current; $R$ is the resistance of the armature circuit; $\phi$ is the main magnetic flux; and $C$ is the coefficient of proportionality. Under normal conditions $E$ is constant, $\phi$ and $R$ may be assumed constant and the equation represents $n$ as a linear function of $I$, or of the torque. The speed of the motor decreases with increasing torque because of the effect of the armature voltage drop which, assuming a constant $\phi$, is directly proportional to the torque. The variation in speed obviously depends upon the armature resistance and usually at rated speed amounts to about 8 to 12 per cent with torque varying from no load to full load torque. At lower speeds the percentage of speed regulation is higher since for lower values of $E$, $IR$ constitutes a higher percentage of the armature voltage and its influence is much more pronounced.

In a system as represented in Fig. 1, however, the interpretation of the speed-load equation must be properly modified. In the first place, neither armature voltage $E$ nor current $I$ are straight direct-current values. In the second place, the average value of voltage $E$ across the armature is not constant as it was in the case of a conventional direct-current drive. If the firing point of the control valves is constant during the time when torque is varied from no-load to full-load, $E$, itself, varies as a function of torque and in this way speed constitutes a much more involved function of $I$ than that represented by the speed-load equation.

The meaning of the concept of armature voltage with reference to the grid-controlled valve supply, as illustrated in Fig. 1, may be clarified by reference to Figs. 2 and 3. Figs. 2 and 3 do not illustrate the operation of the system of Fig. 1 in which the firing point of the control valves may be varied but instead illustrate the operation if the firing point is maintained constant.

For purposes of simplification the potentials relating to only one control valve are plotted against time in Figs. 2 and 3. The base line 113 represents the potential of the cathode of the control valve and to further simplify the curves, it is assumed that the critical control grid-cathode potential necessary to render the control valve conductive is zero, that is, the valve becomes conductive in a positive half-period of the source when the control grid potential rises to the cathode potential 113. The supply potential of the control valve is illustrated by curve 115 and curve 117 represents the control grid potential.

Let it first be assumed that the motor is stalled and thus behaves as an ordinary resistive-inductive load. Under these conditions, the supply potential 115, which is substantially a sine wave, has line 113 as its base. Thus, the anode potential falls along curve 115 at the beginning of a half-period of the anode supply potential. When the grid potential curve 117 rises to the cathode potential line 113 at point 119, the valve becomes conductive and current starts flowing through the armature as shown by curve 121. Because of the armature inductance, the flow of current does not cease when the supply potential 115 passes through zero at point 123 but continues to the point 125. The magnitude of the armature current curve 121 may be very high and depends upon the position of the firing point and the resistance and inductance of the armature. Of course, when the valve becomes conductive the anode potential drops along line 126 to the arc-drop value 127 and remains there until the valve becomes non-conductive at point 125, at which time the anode potential follows first line 128 and then curve 115. The armature voltage then follows a curve formed by points 129, 119, 131, 123, 133, 125.

After the motor is running and its speed is established, the situation is quite different as shown in Fig. 3. Now counter-electromotive force is generated in the armature winding and under steady state conditions represents a constant direct-current potential which may be assumed to be in direct proportion to the speed of the motors under the assumption of constant magnetic flux. The counter-electromotive force is represented by curve 135. It is then apparent that the sine wave of the supply potential curve 115 is based on curve 135 and not on the cathode potential line 113.

The anode potential again falls along curve 115 at the beginning of a positive half-period of the supply potential. At point 119, the valve becomes conductive and the anode potential drops along line 126 to the arc-drop value 127 where it remains until the valve becomes non-conductive at point 137, at which time the anode potential again follows line 128 and then curve 115. When the valve is conductive, current is supplied to the armature as represented by curve 139. Here again, the flow of current does not cease when the curve 115 passes through the line 113 at point 138 but continues to a point 137 where the inductive electromotive force becomes equal to the applied voltage. The average value of the armature IR drop is proportional to the difference in areas 119—131—138 and 138—140—137 and is less than the IR drop represented by the difference in areas 119—131—123 and 123—133—125 in Fig. 2. Consequently, the average value of the armature current represented by curve 139 is less than that represented by curve 121 in Fig. 2.

If the load torque of the motor increases, the armature current increases as well as the IR drop. It is apparent from Fig. 3 that for the same firing point of the control valve, an increase in armature current necessitates a decrease in counter-electromotive force and, therefore, a decrease in speed. Moreover, the average value of voltage across the armature also decreases as it varies with the counter-electromotive force, as can be seen from Fig. 3, instead of remaining constant as is the case for a conventional direct current drive. Therefore, with reference to the speed-load equation, it is apparent that with increasing torque not only does the IR drop increase but the armature voltage decreases so that the speed of the motor tends to decrease very rapidly.

To prevent such changes in speed with changes in torque by my invention, the firing point of the control valves 17 and 23 is automatically adjusted in accordance with torque variations so that the firing point is advanced with increasing torque and delayed with decreasing torque. This is accomplished by controlling the conductivity of the master valve 101.

The control circuit of the master valve 101 may be traced from the control grid 141 through resistor 143, an adjustable tap 145 on a potentiometer 147, a variable resistor 149, resistor 87, contactor 83 of relay 85, adjustable tap 81 on potentiometer 79, conductors 78 and 76 to the cathode 105. As previously set forth, a potential proportional to the armature voltage is present across resistor 87 and the polarity of this potential opposes that of the potential impressed in the control circuit of the master valve by the portion of potentiometer 79 between conductor 78 and tap 81. These two potentials primarily determine the conductivity of the master valve.

Assuming for the moment that the torque remains constant, the conductivity of the master valve 101, and, therefore, the firing point of the control valves and the speed of the motor, is determined by the setting of potentiometer 79. The potentiometer 79 includes a highly resistive portion 151 in series with a highly conductive portion 153. As the adjustable tap 81 is moved from the end of the resistive portion 151 connected to conductor 78, toward the junction of portion 151 and conductive portion 153, the speed of the motor is increased until the average armature voltage necessary to run the motor at rated speed is supplied when tap 81 is at the junction of portions 151 and 153.

If the torque varies, the armature voltage varies as does the potential across resistor 87. Consequently, the conductivity of master valve 101 is varied. The polarity of the potential on resistor 87 is such that an increase in torque acts through resistor 87 to decrease the conductivity of the master valve and advance the firing point of the control valves. Conversely, the resistor potential effects a delaying of the firing point upon a decrease in torque. In this manner the apparatus compensates for variation in armature voltage with variations in load.

To compensate for variations in the IR drop of the armature with variations in load, a potential is also established across potentiometer 147. The potentiometer 147 is connected to a source of direct current potential 155 through the anode 157 and cathode 159 of a first auxiliary valve 161. The control circuit of the first auxiliary valve 161 may be traced from its control grid 163 through a resistor 165, a portion of a potentiometer 167, a capacitor 169 and the variable resistor 149, to the cathode 159.

A small direct-current potential is present across the potentiometer 167 tending to decrease the conductivity of the first auxiliary valve 161. The capacitor 169 is connected in series with a resistor 171 across the resistor 29 in the armature supply circuit. Consequently the capacitor 169 introduces a potential in the control circuit of the first auxiliary valve 161 which is proportional to the current flowing through the armature 41. The potential across the capacitor 169 thus varies with variations in the torque on the armature. These variations in the potential across capacitor 169 are amplified by auxiliary valve 161, and impressed through potentiometer 147 in the control circuit of the master valve 101. The connection of potentiometer 147 in the master valve control circuit is such that an increase in the armature current as a result of an increase in torque, causes the firing point of the control valves to be advanced. Conversely, a decrease in torque effects a delay in the firing point of the control valves. It should be noted that the amount of compensating action may be controlled by adjustment of potentiometer 147 to adapt the apparatus for any particular motor.

Thus, the apparatus compensates for variations in both the armature voltage and the IR drop with variations in load or torque to maintain the motor speed at the value determined by the setting of potentiometer 79.

The starting and acceleration of a direct-current motor raises many additional problems in providing a motor control. In general, there are two methods by which automatic acceleration can be achieved: first, the time delay method, and, second, the current limit method. In the first case, the voltage applied to the armature is gradually increased to its normal value so that the motor is allowed to start smoothly. In the second case, the armature current is not permitted to rise above a predetermined limit and so enables an acceleration consistent with the kind of load with the time of acceleration being different for different loads.

In the system as shown in Fig. 1, the motor is automatically accelerated in a manner affording the advantages of both the time delay method and the current limit method. The resistor 87 in the control circuit of the master valve 101 is also connected in an amplifying circuit extending from the positive terminal of resistor 75 through a resistor 173, the anode 175 and cathode 177 of a second auxiliary valve 179, resistor 87, the contactor 83 of relay 85, tap 81 and a portion of potentiometer 79 and conductors 78 and 76 to the negative terminal of resistor 77. Thus the magnitude of the potential across resistor 87 is also varied as the conductivity of the second auxiliary valve 179 varies. When the potential across resistor 87 is high, the master valve 101 is highly conductive to prevent conduction of current through the control valves 17 and 23.

The second auxiliary valve 179 is preferably a pentode characterized by a sharp cut-off. The control circuit of the second auxiliary valve 179 may be traced from its control grid 181 through a grid resistor 183, a portion of a potentiometer 185, a conductor 187 and resistor 29, to the cathode 177 of the valve 179. The potentiometer 185 is connected in series with a variable resistor 189, across a capacitor 191, through either a contactor 193 of a relay 195 or a contactor 197 of another relay 199. Capacitor 191 is, in turn, connected to another source of direct-current potential 201, through a variable resistor 203, and either a contactor 205 of relay 33, or a contactor 207 of relay 37. The relays 33 and 195 are energized in response to the operation of a forward starting switch 209 and relays 37 and 199 are energized in response to operation of a reverse starting switch 211. In either case following operation of one of the starting devices 209 or 211, the capacitor 191 is charged at a preselected rate as determined by the setting of resistor 203. The potential across the capacitor 191 appears across the potentiometer 185 and a portion thereof is impressed in the control circuit of the second auxiliary valve 179.

When either of the starting switches 209 and 211 is operated, the corresponding one of relays 195 and 199 is energized to close either contactor 193 or 197. At that moment a discharge circuit is completed across capacitor 191 through either contactor 193 or 197 and contactors 213 and 215 of relays 33 and 37 respectively, to discharge the capacitor. Consequently, the potential impressed in the control circuit by potentiometer 185 is substantially zero, and the second auxiliary valve 179 is highly conductive. As a result, the master valve 101 is highly conductive to prevent the control valves 17 and 23 from supplying any current to the armature. After a very short time interval the discharge circuit is opened by the energization of either relay 33 or relay 37 and charging of the capacitor 191 is initiated. As the potential across potentiometer 185 increases with the charging of the capacitor 191, the conductivity of the second auxiliary valve 179 decreases and tends to render the control valves 17 and 23 conductive gradually earlier in successive half-periods of the alternating potential source 5.

As current is supplied to the armature 41, a potential proportional to the magnitude of the current appears across resistor 29 in the control circuit of the second auxiliary valve 179. The polarity of the potential across resistor 29 is opposite to that of the potential across potentiometer 185 in the control circuit. Thus, an increase in the potential across resistor 29 tends to delay the firing point of the control valves and an increase in the potential across potentiometer 185 tends to advance the firing point of the control valves. The second auxiliary valve is, therefore, controlled in accordance with the difference between the potential across the portion of potentiometer 185 in the control circuit thereof and the potential across the resistor 29.

The potential across potentiometer 185 is employed to provide most of the advantages of the time delay method of acceleration. The firing point of the control valves is gradually advanced from a point very late in a half-period because of the increase of the potentiometer potential with the charging of the capacitor 191, thus affording smooth and shockless acceleration.

The potential across resistor 29 is employed to provide most of the advantages of the current limit method of acceleration. The resistor potential has no effect on the position of the firing point unless the armature current tends to exceed the normal range, at which time the resistor potential delays the firing point to keep the armature current within the normal range. The resistor 29 cannot be effective at the start of the accelerating period because it has no control over the firing point until current is flowing. However, the potentiometer potential provides the initial control of the firing point. To obtain acceleration to the desired speed with smooth and shockless starting, the charging rate of the capacitor 191 is adjusted so that control of the firing point by the potentiometer potential extends only over the first few cycles of the source, during which the capacitor is charged to a predetermined potential. Thereafter, the potential of the capacitor is maintained and the potential across resistor 29 acts to maintain the armature current within the normal range. The upper limit of the armature current range is obviously determined by the setting of potentiometer 185 as this setting determines the maximum voltage opposing the voltage across resistor 29 in the control circuit of the second auxiliary valve. Of course, if extremely smooth and slow acceleration is required, the capacitor may be charged more slowly to extend its control of the armature current over to greater number of cycles of the source.

It is to be noted that the action of the second auxiliary valve 179 in response to an increase in armature current is opposite to that of the first auxiliary valve 161. This is necessary because two different functions are to be performed by the two auxiliary valves. However, the circuit constants are such that the second auxiliary valve 179 is maintained non-conductive, by virtue of the negative bias impressed through the potentiometer 185, within the normal operating range of armature current. Thus, within that normal range, the armature current affects only the conductivity of the first auxiliary valve 161. If, however, the armature current rises above the normal range, as it does during the accelerating period, the second auxiliary valve 179 becomes conductive. The characteristics of the valves and the circuit constants are such that the amplifying action of the circuit associated with the second auxiliary valve is much stronger than that of the circuit associated with the first auxiliary valve and completely overwhelms the latter. Under these conditions, it is apparent that the second auxiliary valve, in addition to its effect of limiting the starting current of the armature, delays the firing point of the control valves in case of an overload so that the motor stalls at a torque corresponding to the preselected limit of armature current.

The field 217 of the motor 43 is connected to be supplied with power from the alternating-current source 5 through the secondary 219 of the transformer 11 and a pair of electric discharge field control valves 221 and 223, preferably thyratrons. The end terminals of the secondary 219 are connected through the anode 225 and cathode 227 of each of the valves 221 and 223 to one side of the field 217. The other side of the field 217 is connected to the center tap 229 of the secondary 219. In this manner, the strength of the field is under the control of the field control valves 221 and 223. The grids 231 of the valves 221 and 223 are interconnected through grid resistors 233 and another secondary 235 of the transformer 61. The control circuit of one of the field control valves 221 may then be traced from the grid 231 through the grid resistor 233, one-half of the secondary 235 to the center tap 237 thereof, and thence through a conductor 239, a contactor 241 on relay 85, an adjustable tap 243 on a potentiometer 245, conductor 247, resistor 249, conductor 251, potentiometer 79 and a conductor 253 to the cathode 227.

The secondary 235 of transformer 61 impresses an alternating potential of the same frequency as the source, but displaced in phase relative thereto in the control circuit of the field control valves 221 and 223. Potentiometers 79 and 245 impress a direct-current potential in the control circuit of such magnitude that with the alternating potential from transformer 61, the resultant potential in the control circuit tends to rise above the critical value necessary to render the field control valves conductive at an instant in each half-period which depends upon the setting of the potentiometer 245. However, the resistor 249 is connected in series with the potentiometer 245 and a resistor 261 across the series connected resistors 75 and 77 so that a potential is present across resistor 249. The polarity and magnitude of the potential across resistor 249 overcomes all possible potentials impressed through potentiometer 245 in the control circuit of the field control valves 221 and 223 and causes the valves to be rendered conductive at the beginning of a half-period regardless of the setting of potentiometer 245.

A relay 255 is connected in series with a resistor 257 across the armature 41 of the motor 43. This relay 255 is so designed that it is not actuated until the voltage across the armature 41 reaches the value corresponding to rated speed of the motor. When the relay 255 is actuated, its contactor 259 closes a short circuit across resistor 249. Then the potential across resistor 249 drops to zero so that the setting of potentiometer 245 thereafter controls the amount of current supplied to the field 217.

As previously indicated, relay 85 is energized for forward operation of the motor but remains deenergized for reverse operation. When relay 85 is energized its contactors 83 and 241 connect potentiometers 79 and 245 in the circuits as described. These potentiometers have their adjustable taps 81 and 243 mechanically interconnected to operate in tandem. The resistive element 151 and conductive element 153 of potentiometer 79 are connected in series to be contacted in the order named by the tap 81 upon movement of the latter clockwise over the range of speed settings. The potentiometer 245 is also made up of a resistive element 263 and a conductive element 265 but they are connected in opposite order to the corresponding elements of potentiometer 79 with respect to contact by their associated tap 243.

By this arrangement both potentiometers 79 and 245 are set simultaneously at the desired point on the speed range which extends clockwise from a minimum at the extreme left setting to a maximum at the extreme right setting. Settings within the left half of the potentiometers 79 and 245 are for speeds less than the rated speed of the motor. At settings for speeds less than the rated speed, the tap 81 of potentiometer 79 is on the resistive element 151 to determine the armature voltage but the tap 243 of potentiometer 245 is on the conductive element 265 and does not effect a diminishing of the field from its full strength. In other words, the armature voltage only is adjusted for settings under the rated speed.

When both taps 81 and 243 are set at the junction point between the resistive element and conductive element of their corresponding potentiometers, rated armature voltage with full field strength is provided. Consequently the motor operates at rated speed. It is to be noted that the motor is always operating with a full field at speeds equal to or below rated speed.

Settings of the taps 81 and 243 within the right half of their corresponding potentiometers are for speeds greater than rated speed. Here the tap 81 is on the conductive element 153 and rated armature voltage is supplied. However tap 243 is on resistive element 263 so that after the motor reaches rated speed and relay 255 is actuated, the field strength is diminished to increase the speed to the desired value.

When reverse operation of the motor is to be obtained, relay 85 remains deenergized and its contactors 83 and 241 connect a second pair of potentiometers 267 and 269 in the circuits in place of potentiometers 79 and 245. Potentiometers 267 and 269 correspond to and are connected in the same manner as potentiometers 79 and 245, respectively. The second pair of potentiometers are not necessary to the operation of the apparatus but they do permit a reverse speed different from the forward speed to be selected in advance so that successive forward and reverse operations may be effected in the manner described hereinafter without readjustment of the speed potentiometers.

To initiate operation of the control system, the circuit breaker 7 is closed manually, connecting the system to the alternating-current source 5. After a time interval sufficient to permit the various valves to become heated by their usual cathode heater circuits, which for purposes of simplification are not shown, either the forward switch 209 or the reverse switch 211 may be closed, depending upon the direction of rotation desired.

If the forward switch 209 is closed, relay 195 is energized by a circuit extending from one of the alternating-current lines 271 through a normally closed stop switch 273, the forward switch 209, the coil 275 of the relay 195, to the other line 277 of the source. When relay 195 is energized, its first contactor 279 closes a holding circuit through a normally closed contactor 281 of relay 199. The second contactor 283 of relay 195 opens, but during the starting, it does not effect a change in the circuit. The third contactor 193 closes the circuit between the capacitor 191 and the potentiometer 185 and resistor 189 connected thereacross and also completes the discharge circuit for capacitor 191 through normally closed contactors 215 and 213 of relays 37 and 33. The fourth contactor 285 of relay 195 closes to complete a circuit from the source through the coil 287 of relay 85 and the fifth contactor 289 closes to partially complete a circuit through the coil 291 of relay 33.

When relay 85 is energized in response to the closing of the fourth contactor 285 of relay 195, the first contactor 293 of relay 85 closes, completing a circuit from one line 271 of the source through the coil 291 of relay 33, normally closed contactor 295 of relay 37, the closed fifth contactor 289 of relay 195, and the closed contactor 293 of relay 85, to the other line 277 of the source. As a result, relay 33 is energized, and its first contactor 205 closes the charging circuit of capacitor 191. At the same time the second contactor 213 of relay 33 opens the capacitor discharge circuit and the third contactor 297 opens a circuit through the coil 299 of relay 37. The fourth and fifth contactors 47 and 31 of relay 33 close the circuit through the armature 41 for forward operation thereof. The sixth contactor 301 of relay 33 opens a shunt circuit across the armature 41 which includes a resistor 303 for dynamic braking purposes and normally closed contactor 305 of relay 37.

It is to be noted that, at this time, the relay 255 is deenergized as the voltage across the armature is low, so that the potential across resistor 249 is impressed in the control circuit of the field control valves 221 and 223 so that a full field is provided for the motor regardless of the setting of the potentiometer 245.

When contactors 47 and 31 of relay 33 close connecting the armature 41 in its supply circuit, the capacitor 191 has already been discharged and the potential across potentiometer 185 is zero. The second auxiliary valve 179 is therefore highly conductive, causing a high voltage to be developed across resistor 87 in the control circuit of the master valve 101. Because of the high voltage across the resistor 87, the master valve 101 is highly conductive, developing a high potential across resistor 73 in the control circuit of the armature control valves 17 and 23. Consequently, the control valves 17 and 23 are non-conductive at the instant when the contactors of relay 33 close. At that instant charging of the capacitor 191, at a rate preselected by the setting of resistor 203, is initiated. The potential across potentiometer 185 gradually increases as the charge on the capacitor 191 increases, causing the plate current of the second auxiliary valve 179 to decrease gradually. The potential across resistor 87, and consequently the potential across resistor 73, is then reduced so that the firing point of the control valves 17 and 23 is gradually advanced in successive half-periods of the source.

As current flows through the armature 41, a potential is developed across resistor 29, and the conductivity of the second auxiliary valve 179 is controlled in accordance with the difference between the potential supplied to the control circuit thereof from potentiometer 185 and from resistor 29. The potential supplied from potentiometer 185 is, of course, larger at the beginning, and normally effects an advance of the firing point of the control valves 17 and 23. However, should the armature 41 tend to draw an excessive current, the voltage across resistor 29 rises to such an extent that the rate of advance of the firing point of the control valves 17 and 23 is delayed. The capacitor 191 is sufficiently charged after the first few cycles that it no longer exerts any delay of the firing point. Thereafter, the position of the firing point during the remainder of the acceleration is limited in its advance to the position corresponding to the speed setting, only by the action of resistor 29 in preventing an excessive current. The ultimate position of the firing point is, of course, determined by both the setting of the potentiometer 79 and the steady state load, the maximum advance being provided when the potentiometer tap 81 is set at a point corresponding to rated or greater than rated speed of the motor and with full load on the motor.

Should the potentiometer 79 be set for a speed greater than the rated speed of the motor, the limit of advance of the firing point of the armature control valves 17 and 23 is the same as for a rated speed setting. The additional speed required is then obtained by weakening the field of the motor. When the motor reaches its rated speed following operation of forward switch 209, relay 255 is energized, short-circuiting resistor 249 and permitting the firing point of the field control valves 221 and 223 to be delayed according to the setting of potentiometer 245. The complete delay in the firing point of the field control valves 221 and 223 does not occur immediately, for the induction of the field 217 permits only a gradual decrease in the current to the amount corresponding to the setting of the potentiometer 245. Of course, if the decrease in the field current is too rapid, additional means should be provided to slow down the rate of decrease of the field current. Such may be necessary for very high inertia loads and wide range of speeds by field weakening.

It is to be noted that when the field is first weakened, the armature current tends to increase rapidly, especially on high inertia loads. However, the second auxiliary valve 179 prevents an excessive armature current from flowing in the same manner as previously described.

By the end of the acceleration period, the armature current has dropped within the normal range and the second auxiliary valve 179 becomes non-conductive. Thereafter, the first auxiliary valve 161 is effective to compensate for the IR drop. The first auxiliary valve 161 produces a potential across the potentiometer 147 which varies in accordance with the armature current. However, an increase, or decrease, in the armature current has an opposite effect upon the conductivity of the master valve 101 when applied to the control circuit thereof through potentiometer 147, than when applied through the second auxiliary valve 161 and resistor 87. In other words, if the torque on the motor is increased, tending to draw more current through the armature, the potential across potentiometer 147 increases, resulting in a decrease in the potential on resistor 73 and an advance of the firing point of the control valves 17 and 23. Then the firing point of the main valves 17 and 23 is sufficiently advanced to supply more current to the armature without a decrease in the speed.

When it is desired to halt the operation of the motor, the stop switch 273 may be opened to deenergize relay 195. When relay 195 is deenergized, relays 85 and 33 are also deenergized. The sixth contactor 301 of relay 33 closes the armature shunting circuit through the resistor 303 to provide dynamic braking of the armature 41.

It it is desired to reverse the direction of rotation of the motor, instead of merely stopping the motor, potentiometers 267 and 269 are set for any particular speed desired in the reverse direction and the reversing switch 211 is closed directly instead of opening the stop switch 273. Upon closure of the reversing switch 211, the relay 199 is energized and its second contactor 281 opens the holding circuit to deenergize relay 195 while the first contactor 307 closes a holding circuit for the relay 199. As relay 195 is deenergized, relays 85 and 33 are likewise deenergized. The third contactor 197 of relay 199 closes the circuit connecting potentiometer 185 and resistor 189 across capacitor 191 and also completes the discharge circuit for capacitor 191 through contactors 215 and 213 of relays 33 and 37. The fourth contactor 309 on relay 199 closes the energizing circuit for relay 37 extending from one side 271 of the source through the coil 299 of relay 37, contactor 297 of relay 33, contactor 311 of relay 85 and contactor 309 to the other side 277 of the source. It is to be noted that relay 37 can not be energized until after relay 33 has been deenergized because the third contactor 297 of relay 33 is employed to complete the energizing circuit for relay 37. Consequently, there is an interval of time when the first contactors 205 and 207 of both relays 33 and 37 are open and the second contactors 213 and 215 are closed, permitting a discharge of capacitor 191. For the same reason, there is an interval of time in which the sixth contactors 301 and 305 of both relays 33 and 37 are closed to effect dynamic braking of the armature 41. The interval of time is not sufficient to bring the armature to a complete halt, but the armature is slowed, and subsequent application of a reverse potential effects the complete stopping of the rotation in a forward direction, and rapid acceleration in the reverse direction. Once the armature has started rotating in the reverse direction, the electronic control system again assumes complete control, and operation of the motor in the reverse direction is accomplished in the same manner as described for a forward rotation with potentiometers 267 and 269 replacing potentiometers 79 and 245.

Although I have illustrated and described a preferred embodiment of my invention, I am aware that many modifications thereof are possible. My invention, therefore, is not intended to be limited to the exact embodiment shown.

I claim as my invention:

1. A control system for a direct-current motor having an armature, comprising means adapted to function as a source of alternating potential connected to said armature, an electric discharge valve of the arc-like type interposed in circuit between said source and armature, control means for said valve to render it conductive in a positive half-period of said source potential when a potential more positive than a predetermined critical value is impressed on said control means, means for impressing on said control means an alternating potential of the same frequency but displaced in phase relative to said source, and means for also impressing on said control means a control potential of a selected magnitude corresponding to a desired motor speed, said last-named means including means for producing an auxiliary potential which varies in accordance with variations in both the current through said armature and the voltage across said armature and means for amplifying said auxiliary potential to produce said control potential with the variations in said auxiliary potential causing the speed of said motor to be maintained substantially constant regardless of variations in the load of said motor.

2. A control system for a direct-current motor having an armature, comprising means adapted to function as a source of alternating potential connected to said armature, electric discharge valve means of the arc-like type interposed between said source and armature, control means for rendering said valve means conductive in a positive half-period of said source when a potential more positive than a predetermined critical value is impressed on said control means, means for impressing on said control means an alternating potential of the same frequency as said source potential but displaced in phase relative to said source, an impedance, means functioning as an auxiliary source of substantially constant potential in series with said impedance, an electric control valve interposed between said auxiliary source and impedance to control the flow of current through said impedance and thereby control the potential thereacross, means for impressing the potential across said impedance on said control means, a control circuit for said control valve, means for impressing in said control circuit a potential of a selected magnitude corresponding to a desired motor speed, means for impressing in said control circuit a potential proportional to the voltage across said armature, and means for also impressing in said control circuit a potential proportional to the current through said armature, the conductivity of said control valve being variable in accordance with the resultant potential impressed in said control circuit to maintain the speed of said motor substantially constant regardless of variations in the load of said motor.

3. A control system for a direct-current motor having an armature, comprising means adapted to function as a source of alternating potential connected to said armature, electric discharge valve means of the arc-like type interposed between said source and armature, control means for rendering said valve means conductive in a positive half-period of said source when a potential more positive than a predetermined critical value is impressed on said control means, means for impressing on said control means an alternating potential of the same frequency as said source but lagging in phase relative to said source, means for impressing a positive direct current potential on said control means tending to cause said valve means to become conductive at an instant very early in a half-period, an impedance, means functioning as an auxiliary source of substantially constant potential in series with said impedance, an electric control valve interposed between said auxiliary source and impedance to control the flow of current through said impedance and thereby control the potential thereacross, means for impressing the potential across said impedance on said control means, so that an increase in said impedance potential causes said valve means to be rendered conductive later in a half-period, a control circuit for said control valve, means for impressing in said control circuit a potential of a selected magnitude corresponding to a desired motor speed, means for impressing in said control circuit a potential proportional to the voltage across said armature, and means for also impressing in said control circuit a potential proportional to the current through said armature, the conductivity of said control valve being variable in accordance with the resultant potential impressed in said control circuit with the polarities of the potentials in said control circuit being such that an increase in either the potential of a selected magnitude or the armature current or a decrease in the armature voltage effects a decrease in the conductivity of said control valve.

4. A starting control system for a direct-current motor having an armature and a field winding, comprising means adapted to function as a source of potential, first electric valve means connecting said source to said armature, second electric valve means connecting said source to said field winding, a starting device, a control member for selecting the operating speed of said motor over a range extending to speeds greater than the rated speed of said motor, means responsive to operation of said starting device and including means responsive to the setting of said control member for controlling said first valve means to supply voltage to said armature to accelerate the motor to any selected speed up to and including said rated speed, and additional means responsive to the setting of said control member for controlling said second valve means to supply full field current for all settings up to and including the rated speed and less than full field current for settings greater than the rated speed including means responsive to the speed of said motor for effecting a supply of full field current at all actual speeds of the motor up to and including rated speed.

5. A starting control system for an electric motor having an armature, comprising main electric valve means in circuit with said armature, circuit means adapted to supply a first voltage to said armature under the control of said valve means, a starting device, means for producing a second voltage of a magnitude corresponding to a desired motor speed, means for producing a third voltage proportional to the voltage across said armature, auxiliary valve means for controlling said main valve means responsive to the difference between said second and third voltages to cause a supply of the first voltage to accelerate the motor to the desired speed following operation of said starting device, means for producing a fourth voltage which varies in a preselected manner following operation of said starting device, and means for producing a fifth voltage which is proportional to the current through said armature, said auxiliary valve means also being responsive to said fourth voltage, the variation of which is effective to limit an increase in said first voltage to a preselected rate during an interval immediately following operation of said starting device, and to said fifth voltage which is effective to limit the first voltage to prevent the armature current from exceeding a predetermined maximum.

6. A starting control system for an electric motor having an armature, comprising circuit means including valve means adapted to supply a first voltage to said armature, means for producing a second voltage of a magnitude preselected in accordance with a desired speed of said motor, means for producing a third voltage proportional to the motor speed, a starting device, means for producing a fourth voltage which varies with the difference between a fifth voltage which varies as the current through said armature and a sixth voltage which gradually increases at a preselected rate from a predetermined minimum to a predetermined maximum following operation of said starting device, and means responsive to the difference between said second voltage and the sum of said third and fourth voltages for controlling said valve means to increase gradually the first voltage to accelerate said motor to said desired speed following operation of said starting device, with the sixth voltage being effective to limit the increase in the first voltage to a preselected rate and the fifth voltage being effective to limit the first voltage to prevent the armature current from exceeding a predetermined maximum.

7. A starting control system for an electric motor having an armature adapted to be connected to an alternating potential source, comprising main electric discharge valve means of the arc-like type in circuit with said armature to control the supply of voltage thereto from said source, a starting device, means for producing a second voltage of a magnitude preselected in accordance with the desired speed of said motor, means for producing a third voltage proportional to the voltage across said armature, auxiliary valve means for controlling said main valve means responsive to the difference between said second and third voltages to render said main valve means conductive in positive half-period of said alternating potential to supply a voltage to the armature sufficient to accelerate the motor to said desired speed following operation of said starting device, means for producing a fourth voltage which varies in a preselected manner following operation of said starting device, and means for producing a fifth voltage which is proportional to the current through said armature, said auxiliary valve means also being responsive to said fourth voltage, the variation of which is effective to permit the phase position of the instant in a half period at which said main valve means becomes conductive to advance from a position late in a half period at no greater than a preselected rate following operation of said starting device, and to said fifth voltage which is effective to limit the advance of said phase position to prevent the armature current from exceeding a predetermined maximum.

8. Apparatus according to claim 15 in which the means for producing the fourth voltage comprises a capacitor and means for charging said capacitor at a preselected rate to a predetermined voltage following operation of said starting device.

9. A starting control system for a direct-current motor having an armature, comprising means adapted to function as an alternating voltage source connected to the armature, electric discharge valve means of the arc-like type interposed in circuit between said source and armature, a starting device, control means effective following operation of said starting device for rendering said valve means conductive in half periods of the alternating voltage at an instant in a half-period having a phase position to supply a first voltage to said armature sufficient to accelerate the motor to a desired speed, means for producing a second voltage which varies in a predetermined manner following operation of said starting device, and means for producing a third voltage which varies with current through the armature, said control means being responsive to both said second and third voltages with the manner of variation of the second voltage being effective to delay the phase position of said instant to a point late in a half-period immediately following operation of said starting device and to limit a subsequent advance of the phase position to a predetermined rate and with the third voltage being effective to limit an advance of the phase position to prevent the armature current from exceeding a predetermined maximum.

10. A starting control system for a direct-current motor having an armature, comprising means adapted to function as an alternating voltage source connected to the armature, electric discharge valve means of the arc-like type interposed in circuit between said source and armature, a starting device, control means effective following operation of said starting device for rendering said valve means conductive in half-periods of the alternating voltage at an instant in a half-period having a phase position to supply a first voltage to said armature sufficient to accelerate the motor to a desired speed, means for producing a second voltage which gradually increases from a predetermined first value to a predetermined second value in a preselected time interval following operation of said starting device and is thereafter maintained at said second value, and means for producing a third voltage which varies with current through the armature, said control means being responsive to both said second and third voltages with the second voltage being effective to delay the phase position of said instant to a point late in a half-period immediately following operation of said starting device and to limit a subsequent advance of the phase position to a predetermined rate during said interval and with the third voltage being effective to limit an advance of the phase position to prevent the armature current from exceeding a predetermined maximum.

11. A starting control system for a direct current motor having an armature, comprising means adapted to function as a source of a first alternating voltage, an electric discharge valve of the arc-like type interposed in circuit between said source and armature, control means for rendering said valve conductive in a positive half-period of the source when a voltage more positive than a predetermined critical value is impressed on said control means, means for impressing on said control means a second alternating voltage of the same frequency but displaced in phase relative to said first voltage, a starting device, means for producing a third voltage corresponding to a desired motor speed, means for producing a fourth voltage which varies with the motor speed, means for producing a fifth voltage which varies as the difference between a sixth voltage which varies as current through the armature and a seventh voltage which gradually varies at a preselected rate from a predetermined first value to a predetermined second-value following operation of said starting device, and means associated with the three last-named means for also impressing on said control means an eighth voltage which varies with the difference between the third voltage and the sum of the fourth and fifth voltages to cause following operation of said starting device, the sum of the second and eighth voltages first to become more positive than said critical value at instants in positive half periods, the phase position of which is gradually advanced from a point late in a half period to accelerate the motor to said speed, with the seventh voltage being effective to limit the advance to a preselected rate and the sixth voltage being effective to delay the phase position to prevent the armature current from exceeding a predetermined maximum.

12. A control system for an electric motor having an armature, comprising means adapted to function as an alternating potential source, electric discharge valve means of the arc-like type interposed in circuit between said source and armature for controlling the supply of a first voltage to the armature, a starting device, means for producing a second voltage corresponding to a desired motor speed, means for producing a third voltage which varies as the motor speed, control means effective following operation of said starting device and in response to the difference of said second and third voltages for rendering said valve means conductive in positive half periods of said source potential at an instant in a half period having a phase position tending to effect a supply of first voltage to accelerate the motor to and operate it at the desired speed, means for producing a fourth voltage which gradually changes from a first to a second value during an initial part of the motor acceleration, and means for producing a fifth voltage proportional to current through the armature, said control means also being responsive to said fourth and fifth voltages with the fourth voltage being effective to delay said phase position to a point late in a half period immediately following operation of said starting device and to limit a subsequent advance of the phase position to a predetermined rate during said initial part and the fifth voltage being effective to delay the phase position to prevent the armature current from exceeding a predetermined maximum but tending to advance or delay the phase position with an increase or decrease, respectively, of the armature current below said maximum to maintain the motor speed substantially constant at the desired speed.

13. A control system for an electric motor having an armature, comprising means adapted to function as a voltage source connected to the armature, valve means interposed in circuit between said source and armature for controlling the supply of a first voltage to said armature, a starting device, means for producing a second voltage corresponding to a desired motor speed, means for producing a third voltage which varies as the motor speed, master control means for controlling said valve means and effective following operation of said starting device and responsive to the difference of said second and third voltages to cause a supply of first voltage tending to accelerate the motor to and operate it at said desired speed, means for producing a fourth voltage which gradually changes from a first to a second value during an initial part of the motor acceleration, means for producing a fifth voltage proportional to current through the armature, first auxiliary means responsive to said fifth voltage for controlling the master control means to effect an increase or decrease in first voltage with an increase or decrease, respectively, in armature current to maintain the motor speed substantially constant at the desired speed, and second auxiliary means responsive to said fourth and fifth voltages for controlling said master control means to limit an increase in first voltage to a preselected rate during said initial part and to limit an increase in first voltage to prevent the armature current from exceeding a predetermined maximum.

14. A starting control system for an electric motor having an armature, comprising means adapted to function as a voltage source connected to said armature, valve means interposed in circuit between said source and armature, a starting device, control means for controlling said valve means and effective immediately following operation of said starting device to cause a supply of a first voltage from said source to said armature sufficient to accelerate said motor to a preselected speed, means for producing a second voltage which varies in a predetermined manner following operation of said starting device, and means for producing a third voltage proportional to the current through said armature, said control means being responsive to both said second and third voltages with the manner of variation of the second voltage being effective to limit an increase in the first voltage to a predetermined rate during an interval immediately following operation of said starting device and the third voltage being effective to limit the first voltage to prevent the armature current from exceeding a predetermined maximum.

15. A starting control system for an electric motor having an armature, comprising means adapted to function as a voltage source connected to said armature, valve means interposed in circuit between said source and armature, a starting device, control means for controlling said valve means and effective immediately following operation of said starting device to cause a supply of a first voltage from said source to said armature sufficient to accelerate said motor to a preselected speed, means for producing a second voltage which gradually changes from a predetermined first value to a predetermined second value in a preselected time interval immediately following operation of said starting device and is thereafter maintained at said second value, and means for producing a third voltage proportional to the current through said armature, said control means being responsive to both said second and third voltages with the second voltage being effective to limit an increase in the first voltage to a predetermined rate during said time interval and the third voltage being effective to limit the first voltage to prevent the armature current from exceeding a predetermined maximum.

16. A starting control system for an electric motor having an armature, comprising means adapted to function as a voltage source connected to said armature, a starting device, control means interposed in circuit between said source and armature for controlling the supply of a first voltage from said source to said armature and effective immediately following operation of said starting device to cause a supply of said first voltage to accelerate the motor to a preselected speed, and means for producing a second voltage which varies in a predetermined manner following operation of said starting device, said control means being responsive to current through the armature to limit the first voltage to prevent said current from exceeding a predetermined maximum and also responsive to said second voltage the manner of variation of which is effective to limit an increase in the first voltage to a predetermined rate during an interval immediately following operation of said starting device.

17. A starting control system for an electric motor having an armature, comprising means adapted to function as a voltage source connected to said armature, control means interposed in circuit between said source and armature for controlling the supply of a first voltage from said source to said armature, means for producing a second voltage of a magnitude corresponding to a desired motor speed, means for producing a third voltage proportional to the motor speed, a starting device, said control means being effective immediately following operation of said starting device and in response to the difference of said second and third voltages to cause a supply of the first voltage sufficient to accelerate the motor to said desired speed, and means for producing a fourth voltage which varies in a predetermined manner following operation of said starting device, said control means being responsive to the current through the armature to limit the first voltage to prevent said current from exceeding a predetermined maximum and also responsive to said second voltage the manner of variation of which is effective to limit an increase in the first voltage to a predetermined rate during an interval immediately following operation of said starting device.

18. A starting control system for an electric motor having an armature, comprising means adapted to function as a voltage source connected to said armature, a starting device, control means interposed in circuit between said source and armature for controlling the supply of a first voltage from said source to said armature and effective immediately following operation of said starting device to cause a supply of said first voltage to accelerate the motor to a preselected speed, means for producing a second voltage which varies in a predetermined manner following operation of said starting device, and means for producing a third voltage proportional to the current through the armature, said control means being responsive to both said second and third voltages with the manner of variation of the second voltage being effective to limit an increase in the first voltage to a predetermined rate during an interval immediately following operation of said starting device and the third voltage being effective to limit the first voltage to prevent the armature current from exceeding a predetermined maximum.

19. A starting control system for an electric motor having an armature, comprising means adapted to function as a voltage source connected to said armature, control means interposed in circuit between said source and armature for controlling the supply of a first voltage from said source to said armature, means for producing a second voltage of a magnitude corresponding to a desired motor speed, means for producing a third voltage proportional to the motor speed, means for producing a fourth voltage which varies with the current through the armature, a starting device, and means for producing a fifth voltage which varies in a predetermined manner following operation of said starting device, said control means being effective immediately following operation of said starting device and in response to the difference of said second and third voltages to cause a supply of said first voltage to accelerate the motor to the desired speed and being further responsive to said fourth and fifth voltages with the fourth voltage being effective to limit the first voltage to prevent the armature current from exceeding a predetermined maximum and the manner of variation of the fifth voltage being effective to limit an increase in the first voltage to a predetermined rate during an interval immediately following operation of said starting device.

20. A starting control system for an electric motor having an armature, comprising means adapted to function as a voltage source connected to said armature, main valve means interposed in circuit between said source and armature for controlling the supply of a first voltage from said source to said armature, a starting device, a first auxiliary circuit including a master valve for controlling said main valve means in accordance with the conductivity of said master valve, means for producing a second voltage corresponding to a desired motor speed, means for producing a third voltage which varies with the motor speed, means for producing a fourth voltage which varies with current through the armature, means for producing a fifth voltage which varies in a predetermined manner following operation of said starting device, a second auxiliary circuit including an auxiliary valve responsive to said fourth and fifth voltages for producing a sixth voltage which varies in accordance with the conductivity of said auxiliary valve, and control means for controlling the master valve according to the difference between said second voltage and the sum of said third and sixth voltages to increase gradually the first voltage following operation of said starting device to accelerate the motor to said speed, with the fourth voltage being effective to limit the first voltage to prevent the armature current from exceeding a predetermined maximum and the manner of variation of the fourth voltage being effective to limit an increase in the first voltage to a predetermined rate during an interval following operation of the starting device.

21. A starting control system for an electric motor having an armature and a field winding, comprising means adapted to function as a main voltage source, first valve means connecting said source and armature, second valve means connecting said source and field windings, a first potentiometer for said first valve means having end terminals and an adjustable intermediate tap, a second potentiometer for said second valve means having end terminals and an adjustable intermediate tap, means for impressing a voltage between the end terminals of each of said potentiometers, a single control member for simultaneously adjusting said intermediate taps to select the motor speed over a range from a minimum speed setting for less than rated speed through a rated speed setting to a maximum speed setting for greater than rated speed, said first potentiometer including a resistive element and a conductive element connected in series in the order named from its one end terminal adjacent the minimum setting to the other and said second potentiometer including a conductive element and a resistive element connected in series in the order named from its one terminal adjacent the minimum setting to the other, a starting device, means operable following operation of said starting device and responsive to the voltage between said one terminal and the tap of said first potentiometer for controlling said first valve means to supply voltage to the armature to accelerate the motor to any selected speed up to and including rated speed, and means responsive to the voltage of said second potentiometer between its one terminal and tap for controlling said second valve means to supply full field current for all selected speeds up to and including rated speed and correspondingly less than full field current for speeds greater than rated speed including means responsive to the motor speed for maintaining full field current at all actual motor speeds up to and including rated speed.

22. A control system for an electric motor having an armature, comprising means adapted to function as a voltage source connected to the armature, control means interposed in circuit between said source and armature for controlling the supply of a first voltage to said armature, a starting device, means for producing a second voltage corresponding to a desired motor speed, means for producing a third voltage which varies as the motor speed, said control means being effective following operation of said starting device and in response to the difference of said second and third voltages to cause a supply of first voltage tending to accelerate the motor to and operate it at the desired speed, means for producing a fourth voltage which gradually changes from a first to a second value during an initial part of the motor acceleration, and means for producing a fifth voltage proportional to current through the armature, said control means also being responsive to said fourth and fifth voltages with the fourth voltage being effective to limit an increase in the first voltage to a preselected rate during said initial part and the fifth voltage being effective to limit the first voltage to prevent the armature current from exceeding a predetermined maximum but tending to vary the first voltage with and in the same direction as the armature current below said maximum to maintain the motor speed substantially constant at the desired speed.

KONSTANTY P. PUCHLOWSKI.

REFERENCES CITED

The following references are of record in the file of this patent:

UNITED STATES PATENTS

| Number | Name | Date |
|---|---|---|
| 2,312,117 | Moyer et al. | Feb. 23, 1943 |
| 2,312,116 | Moyer et al. | Feb. 23, 1943 |
| 2,082,496 | Howe | June 1, 1937 |